(No Model.)

J. G. SCHREUDER.
RAILWAY SIGNALING.

No. 543,785.

2 Sheets—Sheet 1.

Patented July 30, 1895.

WITNESSES:
Darwin B. Wolcott
Chas. F. Miller

INVENTOR,
Jeans G. Schreuder
by George H. Christy
Att'y.

(No Model.)

J. G. SCHREUDER.
RAILWAY SIGNALING.

No. 543,785.

2 Sheets—Sheet 2.

Patented July 30, 1895.

WITNESSES:

INVENTOR,
Jacus G. Schreuder,
by George H. Christy
Att'y.

UNITED STATES PATENT OFFICE.

JENS G. SCHREUDER, OF EDGEWOOD PARK, ASSIGNOR TO THE UNION SWITCH AND SIGNAL COMPANY, OF SWISSVALE, PENNSYLVANIA.

RAILWAY SIGNALING.

SPECIFICATION forming part of Letters Patent No. 543,785, dated July 30, 1895.

Application filed March 28, 1894. Serial No. 505,435. (No model.)

*To all whom it may concern:*

Be it known that I, JENS G. SCHREUDER, a subject of the King of Sweden and Norway, residing at Edgewood Park, in the county of Allegheny and State of Pennsylvania, have invented or discovered certain new and useful Improvements in Railway Signaling, of which improvements the following is a specification.

Considerable annoyance and trouble are encountered in electric signaling and other like arts by the adherence of the armature to the poles of a relay after its circuit has been broken, due to residual magnetism in the cores of the magnets, and also by the welding of the contact-strip carried by the armature to one of the contact-points by heavy electric currents during a thunder storm, thereby preventing the completion or interruption of a signal-circuit controlled by the relay.

The object of the present invention is to provide for the certain and instant obliteration or removal of residual magnetism or reversal of polarity of the cores of the magnet and the consequent immediate movement of the armature of a relay from its poles on the breaking of the main circuit of the relay, and also to provide a shunt-circuit in case of the welding of the contact-strip of the armature to one of the contact-points.

Figure 1:
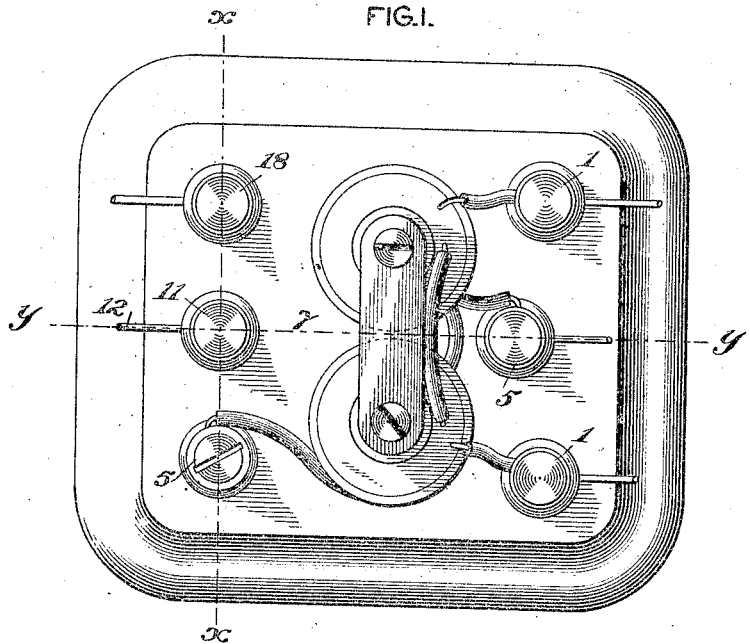
Figure 2:
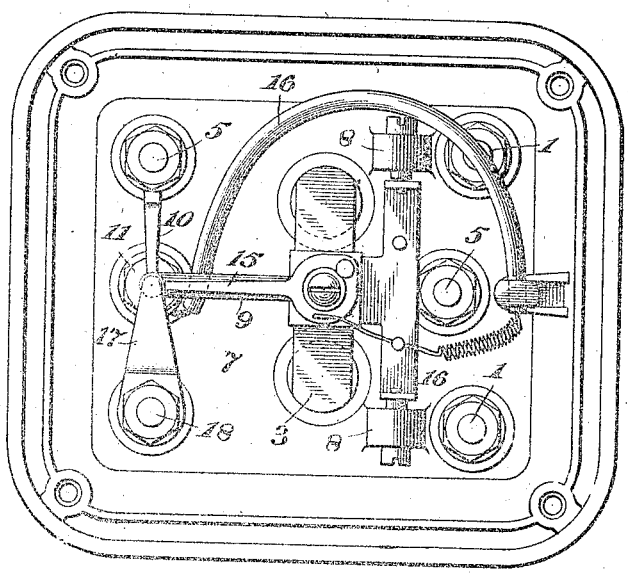
Figure 3:
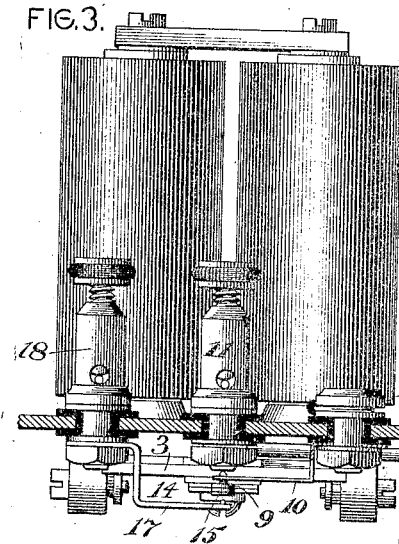
Figure 4:
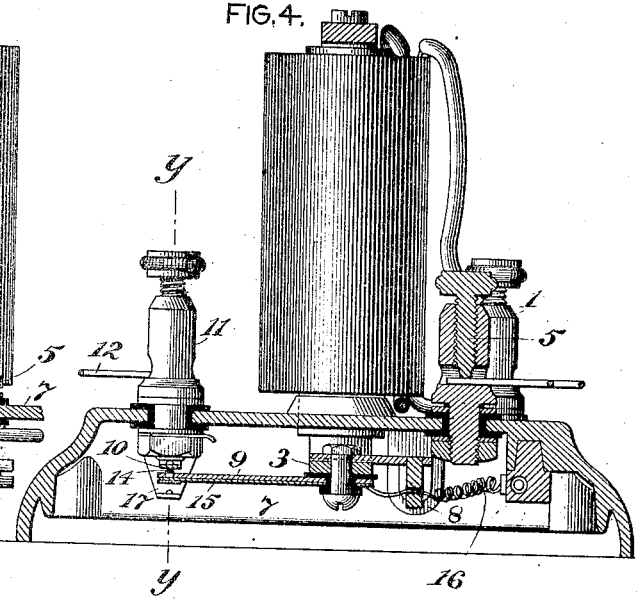
Figure 5:
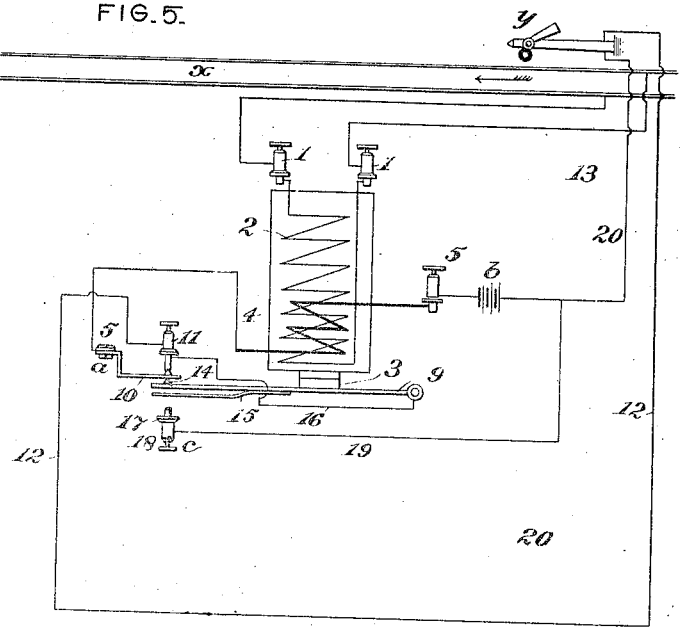

In the accompanying drawings, forming a part of this specification, Figure 1 is a top plan view of a relay constructed in accordance with my invention. Fig. 2 is a plan view of the under side of the relay. Figs. 3 and 4 are sectional elevations, the planes of section being indicated by the lines *x x* and *y y*, Fig. 1, respectively; and Fig. 5 is a diagrammatic view illustrating the manner of winding the magnets and the circuits thereof in a railway signaling system.

In the practice of my invention the binding-posts 11, forming poles of the main coil 2 of the magnets, are connected to the opposite poles of the battery *a*, the rails of an insulated section *x* of track being included in the circuit of the battery, the latter being connected to the rails at one end of the section and the poles of the magnet to the rails at the opposite end of the section, as is customary, so that when a train enters the section the battery will be short-circuited. On the breaking of the circuit of battery the armature 3 of the magnet should drop, so as to break the circuit to the signal *y*, thereby causing the signals to go to "danger." In order to prevent the armature from adhering to the cores of the magnets, as it frequently does, with sufficient force to resist the retractive power of the spring employed for shifting the armature, a second coil 4 is wound around the cores of the magnet in the opposite direction to the winding of the coil 2, and the poles 5 of this second coil are so connected to the poles of the battery *b* that current through the coil 4 will tend to change the polarity of the cores of the magnet from that produced by the current through the coil 2. The size or number of turns in the coil 4 is so proportioned to that of the coil 1, and to the relative strength of the batteries *a* and *b*, that the action produced or tended to be produced by the currents in the coil 4 is not sufficient to overcome the attractive power produced by the current through the coil 2, nor to produce, when the circuit through the coil 2 is broken, a sufficient attractive force in the cores to pull the armature away from the back contact 17.

The magnets, constructed as described, are secured upon a base-plate 7, the ends of the cores of the magnet, which are formed of soft iron, projecting through the plate, as shown in Figs. 2 and 4. On the under side of the plate 7 are formed lugs 8, between which the soft-iron armature 3 is pivoted, and on the armature is secured a finger 9, adapted, when the armature is attracted to the poles of the magnet, to press one end of the spring 10 against the contact-point formed by the lower end of the binding-post 11 for the wire 12 leading to the signal 13. The opposite end of the spring 10 is secured to the end of a screw forming one of the poles 5 of the secondary coil 4. The finger 9 is provided with a block or lug 14, of insulating material, which bears against the spring 10 and prevents the passage of the current from the spring to the finger, on which is attached a conducting-strip 15, connected by a wire 16 to the binding-post 11 and adapted, when the armature is kicked away from the magnet by operation of the secondary coil 4, to come into electrical contact with a bracket 17, attached to the end of a binding-post 18, for the wire 19, forming part of the shunt-circuit, to be hereinafter described. The opposite end of the wire 19 is connected to the return-wire 20 from the signal.

It will be understood that the strip 15 may be omitted and the finger 9 employed as part of the shunt-circuit. In lieu of the return-wire 20 one pole of the battery $b$ and of the electric mechanism at the signal may be grounded, in which the wire from the binding-post 18 will also be grounded.

As soon as the battery $a$ is short circuited by the entrance of a train upon the section $x$ the secondary coil, whose circuit is normally closed, holding the signal at "safety," will be effective to change the polarity of the cores of the magnets and the armature 3 will move away from the poles of the magnet. This movement of the armature permits the spring 10 to move away from the binding-post 11, thereby breaking the signal-circuit and permitting the signal to go to "danger." As the secondary coil is included in the signal-circuit, the cores of the magnet will not be excited sufficiently long by the secondary coil to have any attractive effect upon the armature.

It sometimes happens that the spring 10 is welded or soldered to the end of the binding-post 11 by a heavy current in the line 12, due to lightning or its coming in contact with a heavily-charged conductor. When this occurs, the signal-circuit will not be broken by the movement of the armature from the magnets, and hence the signal will not go to "danger." This objectionable feature is overcome by the shunt-circuit hereinbefore described, which consists of the wire 14, extending from the binding-post 11 to the finger 9 or the conducting-strip 15 thereon, bracket 17, binding-post 18, wire 19, and wire 20 or earth, in case a return-wire from the signal is not employed. When the armature moves away from its magnet and the spring 10 adheres to the binding-post 11, the shunt-circuit will be closed by contact of the finger 9 or strip 15 with the binding-post 18 or bracket 17, and as this shunt-circuit presents less resistance than the signal-circuit the latter will be broken. The movement of the armature to the magnets will break the shunt-circuit, whereupon the current from battery $b$ will again flow through the signal-circuit.

It is characteristic of my improvement that a retracting-spring or other equivalent device is not employed for shifting the armature away from the magnets, but immediately on the breaking of the circuit of the main coil 2 the armature moves away from the magnets, as the change of polarity of the core destroys all residual magnetism and the force produced by the coil 4 is not sufficient to hold the armature to the magnets.

It is not necessary to wind the coils 2 and 4 in opposite directions, provided the respective poles or terminals of the coils be so connected with the battery or batteries that currents in the coils will flow in opposite directions, and thereby tend to produce different polarities in the core of the magnet; but the windings of the coil 4 should be less than those of the coil 2, in order that the coils may not counterbalance each other.

It will be observed that the circuit through the coil 4 is not completed except when the shunt-circuit is employed until the armature under the influence of the coil 2 has completed its movement, so that there will not be any resistance by the coil 4 to the movement of the armature.

I claim herein as my invention—

1. A differentially wound relay having a non-polarized core, in combination with a non-polarized armature, the winding of the relay being greater in one direction than the other and of a sufficient number of turns to produce a considerable force in the core, the lesser windings having a sufficient number of turns to change the polarity of the core when the circuit through the greater winding is broken, but not to produce a material attractive force in the core, substantially as set forth.

2. In a signaling system, the combination of a track circuit, a differentially wound relay, the winding in one direction being greater than that in the other direction, the greater coil being included in the track circuit, and a normally closed signal circuit controlled by the relay, and including therein the lesser coil of the relay, substantially as set forth.

3. In a signaling system, the combination of a track circuit, a differentially wound relay having its greater coil included in the track circuit, a normally closed signal circuit controlled by the relay and including therein the lesser coil of the relay, and a shunt circuit closed by the movement of the armature away from the magnet, and also including therein the lesser coil of the relay, substantially as set forth.

4. In a signaling system, the combination of a track, a relay provided with two differently proportioned coils, the greater coil being included in the track circuit, and a normally closed signal circuit controlled by the relay and including therein the lesser coil of the relay, said coils being so connected in the circuits that electric currents will pass in opposite directions through the coils, substantially as set forth.

5. In a signaling system, the combination of a track circuit, a relay provided with two differently proportioned coils, the greater coil being included in the track circuit, a normally closed signal circuit having the lesser coil included therein, a make and break mechanism controlled by the armature of the relay, and so constructed as to close the signal circuit only when the armature is in or approximately in contact with the poles of the relay, substantially as set forth.

In testimony whereof I have hereunto set my hand.

JENS G. SCHREUDER.

Witnesses:
DARWIN S. WOLCOTT,
F. E. GAITHER.